United States Patent
Saito et al.

(10) Patent No.: US 7,124,239 B2
(45) Date of Patent: Oct. 17, 2006

(54) MEMORY UPDATING SYSTEM FOR FIELD DEVICE

(75) Inventors: Yoji Saito, Musashino (JP); Seiichiro Takahashi, Musashino (JP); Satoru Ochiai, Musashino (JP); Masaaki Nikkuni, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/006,851

(22) Filed: Dec. 8, 2004

(65) Prior Publication Data
US 2005/0137719 A1   Jun. 23, 2005

(30) Foreign Application Priority Data
Dec. 9, 2003   (JP) .......................... P2003-409771

(51) Int. Cl.
G06F 12/12   (2006.01)
G06F 13/00   (2006.01)
G06F 9/44    (2006.01)
G05B 15/00   (2006.01)
G05B 19/42   (2006.01)

(52) U.S. Cl. ................ 711/103; 711/159; 717/173; 700/75; 700/87

(58) Field of Classification Search ............. 700/9–12, 700/14, 19, 21, 22, 46, 75, 79, 87, 17; 711/154, 711/159, 167, 170, 100, 103; 713/100; 717/171–173
See application file for complete search history.

(56) References Cited

U.S. PATENT DOCUMENTS

| | | | | |
|---|---|---|---|---|
| 5,153,880 A | * | 10/1992 | Owen et al. ............... | 714/710 |
| 6,055,633 A | * | 4/2000 | Schrier et al. ............. | 713/100 |
| 6,407,947 B1 | * | 6/2002 | Ahn et al. ................ | 365/185.29 |
| 6,501,682 B1 | * | 12/2002 | Yoshida .................. | 365/185.22 |
| 7,020,024 B1 | * | 3/2006 | Sim ...................... | 365/185.23 |
| 2003/0097521 A1 | * | 5/2003 | Pfandler et al. .......... | 711/103 |
| 2003/0135689 A1 | * | 7/2003 | Fan et al. ............... | 711/103 |
| 2004/0015952 A1 | * | 1/2004 | Lajoie et al. ............ | 717/171 |

FOREIGN PATENT DOCUMENTS

| | | |
|---|---|---|
| JP | 2001-350504 | 12/2001 |
| JP | 2003-510710 | 3/2003 |
| JP | 2005135223 A | * 5/2005 |

* cited by examiner

Primary Examiner—Crystal J. Barnes
(74) Attorney, Agent, or Firm—John J. Penny, Jr.; Edwards Angell Palmer & Dodge LLP (57) ABSTRACT

A memory updating system for a field device involves a fieldbus, one or more field devices that incorporate a nonvolatile memory and are connected to the fieldbus, a host system that is directly or indirectly connected to the fieldbus and transmits an updating instruction and updating data to one of the field devices in order to update the nonvolatile memory of the field device, and a current control circuit that controls a current provided from the fieldbus. The current control circuit increases the current provided from the fieldbus to a value greater than a normal value before the field device erases data stored in the nonvolatile memory, and returns the current provided from the fieldbus to the normal value after the field device completes the erasing of the data stored in the nonvolatile memory.

5 Claims, 7 Drawing Sheets

MEMORY UPDATING SYSTEM FOR FIELD DEVICE

BACKGROUND OF THE INVENTION

1. Field of the Invention

The present invention relates to a memory updating system for a field device, used at a process field, that rewrites data, such as firmware or configuration data, stored in a nonvolatile memory in the field device.

2. Description of the Related Art

JP-A-2001-350504 and JP-A-2003-510710 are referred to as related art of the memory updating system.

JP-A-2001-350504 discloses the steps of: performing a calculation process in a first memory area; deactivating the first memory area; and activating a second memory area, whereby reconfiguration can be performed in an online mode.

JP-A-2003-510710 discloses the steps of: employing a standard communication protocol to download a program instruction from a host to a field device; and storing the program instruction, whereby re-programming of a field device in a process control network is performed.

Figure 1:
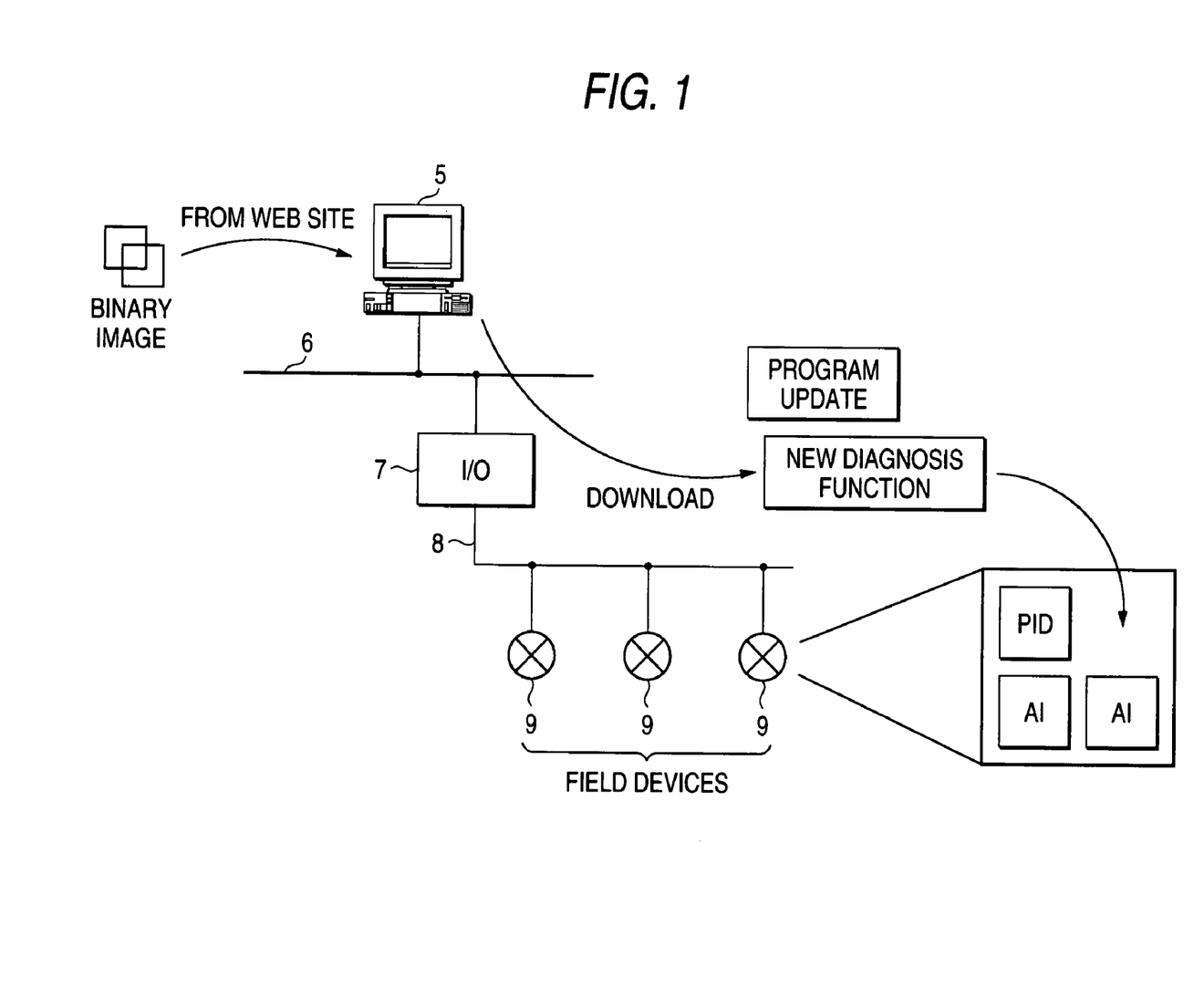
FIG. 1 is a diagram showing the configuration of a conventional process control system.

FIG. 1 is a diagram showing the general configuration of a process control system. A plurality of field devices 9 are connected to a fieldbus 8 such as a FOUNDATION Fieldbus or a serial transmission fieldbus. Each of the field devices 9 incorporates an analog input function block AI or a PID function block PID.

The fieldbus 8 is connected to a host system 5 through an I/O unit 7 and a control bus 6. In such a process control system, a signal is received from a sensor (not shown), and data are transferred between the field devices 9 or between the field devices 9 and the host system 5.

In the field device 9, a program for performing a computation in order to convert a signal received from a sensor into an output signal, and configuration data indicating network information are generally stored in a nonvolatile memory, such as an EPROM, a Flash memory or a EEPROM.

Recently, in order to enhance a function decentralization for the purpose of process improvement, an additional function, such as an extension of a self diagnosis function, is also required to the field device 9. Furthermore, since there is the variety of functions, the possibility that bugs will exist in the firmware is also increased. Therefore, the updating of the firmware inside the field device 9 is also performed by using the communication function of the field bus 8.

In this case, a binary image of the firmware is transmitted to the host system 5, and is transferred, through the control bus 6, the I/O unit 7 and the field bus 8, to the field device 9, which then rewrites the received binary image. The binary image of the firmware may be obtained from a web site across the Internet.

Figure 2:
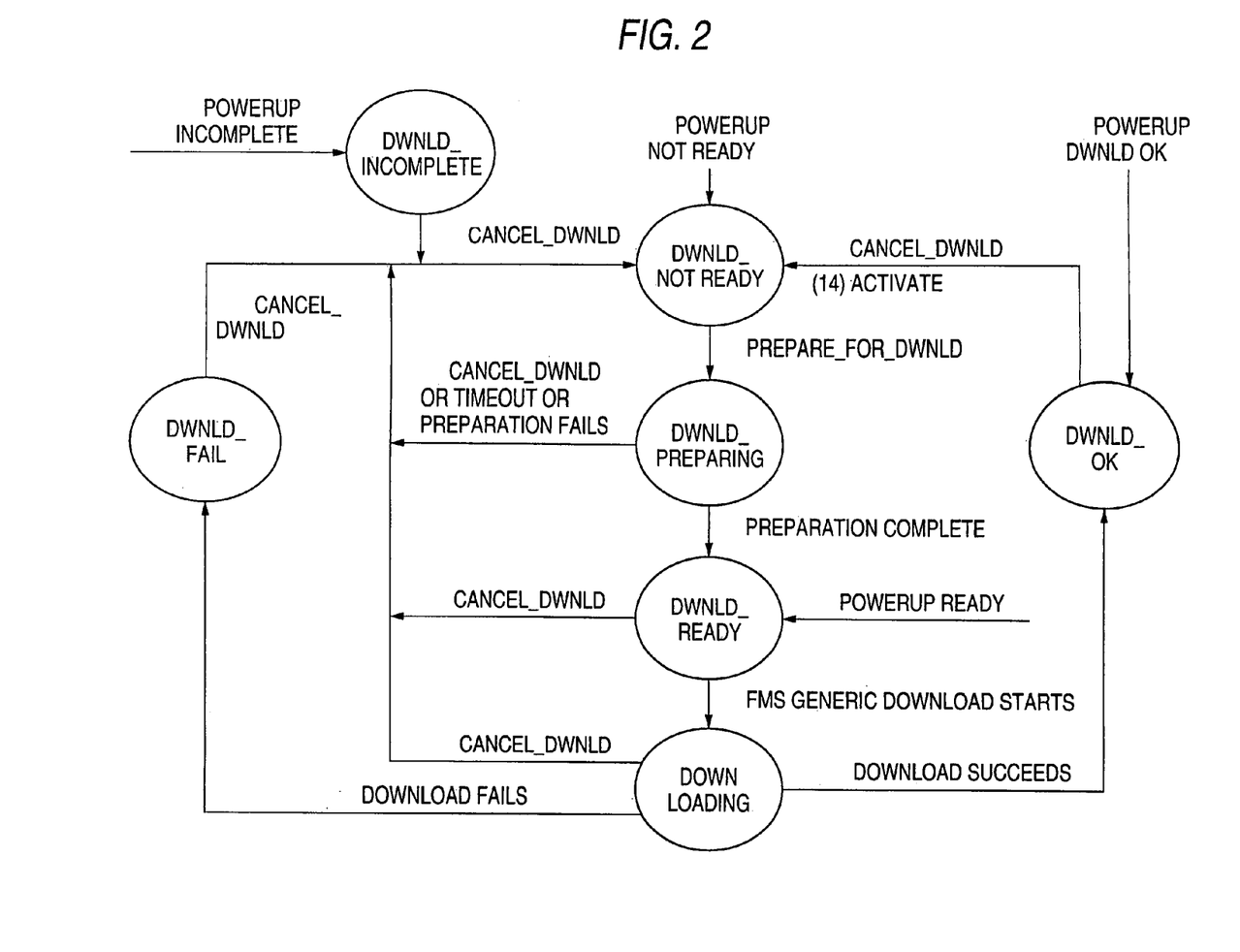
FIG. 2 is a diagram showing a part of the specification for the FOUNDATION Fieldbus.

FIG. 2 is a diagram showing a part of the Software Download specification of the FOUNDATION Fieldbus. This specification is based on an assumption that the firmware of the field device 9 will be updated with using a fieldbus communication, and commands such as PREPARE_FOR_DWNLD and CANCEL_DWNLD are prepared.

However, the field device used to update the firmware has the following problems.

A field device that employs a Flash ROM or an EEPROM as the nonvolatile memory can update the firmware through the fieldbus. However, current consumption inside of the field device temporarily increases during the update of the nonvolatile memory.

Figure 3:
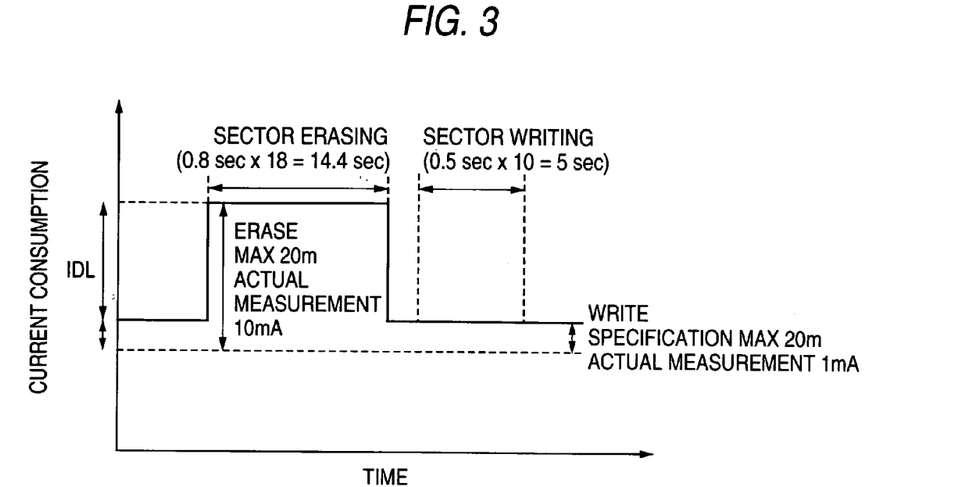
FIG. 3 is a characteristic drawing showing the consumption of power during the updating of nonvolatile memory.

FIG. 3 is a drawing showing the actual value of the measured power consumed when data in the Flash ROM are rewritten. When data are rewritten in the Flash ROM, data in each sector are erased and then new data is written to the Flash ROM. The values IDL (I Download), which indicates an increase in the power consumed during sector erasing, are a maximum of 20 mA and an actual measurement of 10 mA. Further, the increase in the power consumption for data writing was the maximum of 20 mA, while the actual measurement was 1 mA. In accordance with these measurements, it is found that mainly during sector erasing the consumption of power is considerably increased.

Therefore, when the host system 5 arbitrarily rewrites the firmware stored in the field device 9, an increase of 20 mA in the consumption of power for each field device must be considered when designing a power source circuit and other components. Consequently, the costs will be increased.

When the host system 5 updates the firmware for the field devices 9 one by one, the consumption of power can be reduced to 20 mA at the maximum. However, because of a limitation in the transfer rate (31.25 kbps) for the fieldbus 8, about thirty minutes, for example, is required to update each device. When ten field devices 9 are constituted in one segment, a maximum of 300 minutes is taken in order to update all of the field devices 9, so that this is not practical.

Assuming that the firmware size is about 300 kilo bytes, the communication interval is one second and the number of bytes transferred during each communication interval is about 200 bytes, the following updating time is required for rewriting.

$$\begin{aligned}
\text{Updating time} &= ROM \text{ capacity} \times \text{Communication interval} \\
&\quad \text{(seconds)}/\text{The number of transferred bytes} \\
&= 300 \text{ k} \times 1/200 \\
&= 1500 \text{ seconds} = 25 \text{ minutes}
\end{aligned}$$

Thus, since the power supplied to the field device 9 would become insufficient, data could not be rewritten, and the number of field devices 9 that could be connected to the fieldbus 8 is limited.

SUMMARY OF THE INVENTION

The object of the present invention is to provide a memory updating system for a field device for which an increase in the consumption of power during a firmware update can be minimized, and the updating time can also be shortened. In the description, a host system is responsible for the updating of the firmware for a field device. However, this invention can also be applied for the updating of firmware by using a "temporary device" that conforms to the fieldbus standards, i.e., a setup tool that is temporarily connected for the maintenance or the parameter setup of the field device. This temporary device is also included as a host system described in the description.

DETAILED DESCRIPTION OF THE PREFERRED EMBODIMENTS

A embodiment of the present invention will now be described in detail with reference to the drawings. Since the principal configuration of a process control system of the embodiment is the same as that in FIG. 1, no further explanation will be given. The field devices 9 are separated into segments, and managed in accordance with the configuration of the process control system, and a plurality of the field devices 9 are included in one segment. These segments are employed as units to update the contents of the nonvolatile memories of the field devices 9.

Figure 4:
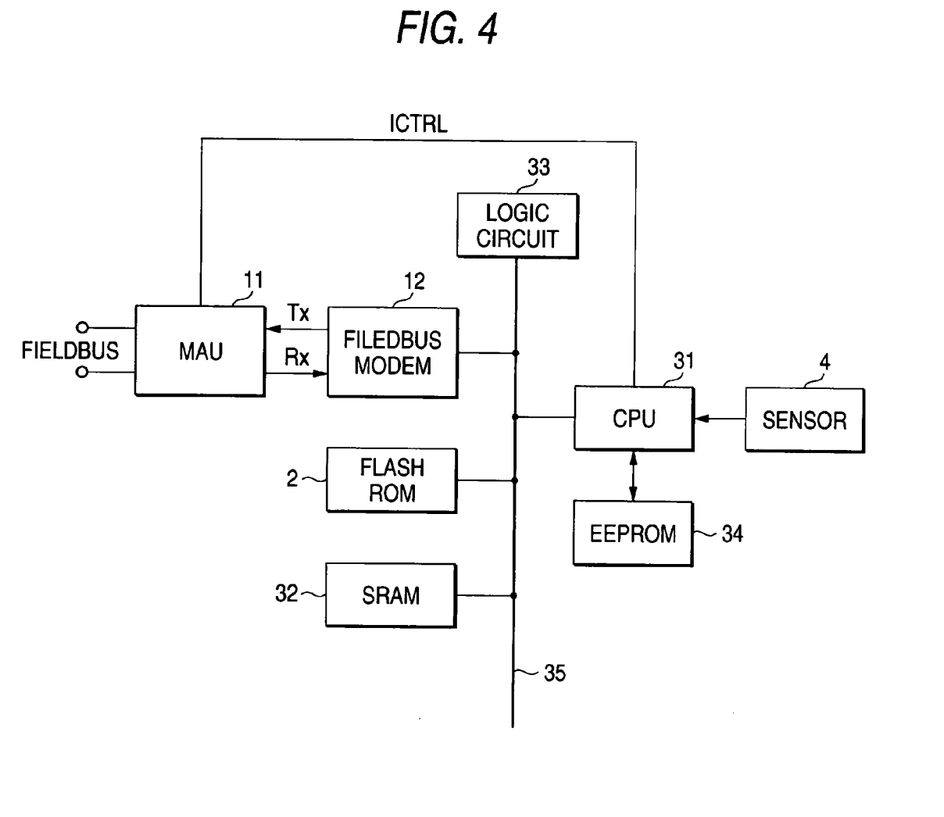
FIG. 4 is a diagram showing a configuration according to one embodiment of the present invention.
Figure 5:
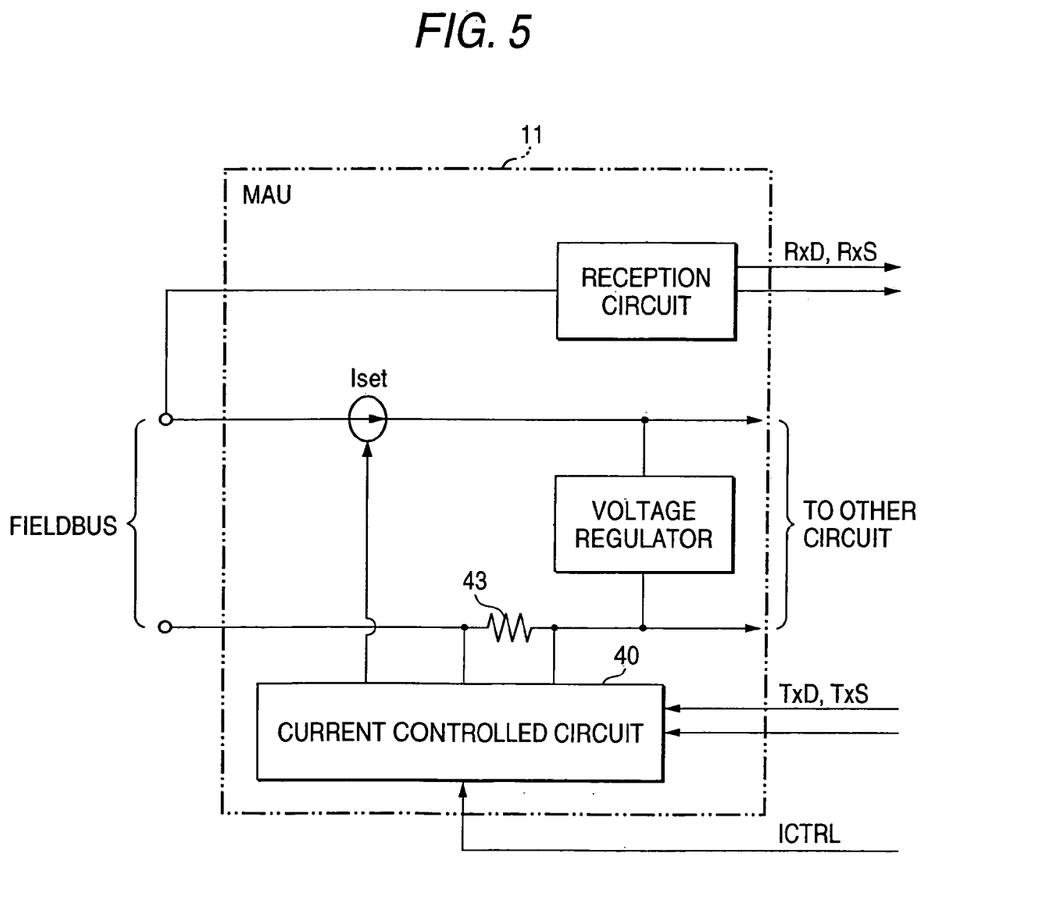
FIG. 5 is a schematic block diagram showing an MAU (Media Attachment Unit)

FIG. 4 is a diagram showing one field device 9 according to the embodiment of the present invention. FIG. 5 is a diagram showing the configuration of an MAU (Media Attachment Unit) used for the embodiment.

In FIGS. 4 and 5, an MAU 11 is connected to a fieldbus (not shown in FIGS. 4 and 5), and functions as a D/A converter and an A/D converter, a transmission/reception circuit, and a circuit for generating the internal power source voltage. The MAU 11 also functions as a current control circuit.

An FB modem 12 converts a signal into a form to be output to the fieldbus, and invertedly converts a signal transmitted along the fieldbus. TxD and TxS in FIG. 5 are signals to be output to the fieldbus, and RxD and RxS in FIG. 5 are signals to be received from the fieldbus.

A FlashROM 2 stores data such as firmware and configuration data. A CPU 31 controls the entire field device. A SRAM 32 is used as a work area for the CPU 31.

A logic circuit 33 includes a required digital circuit. An EEPROM 34 stores parameters used by the CPU 31. The CPU 31, the SRAM 32, the logic circuit 33, an FB modem 12 and the FlashROM 2 are interconnected by a bus 35. A signal output from a sensor 4 that measures the process parameter is transmitted to the CPU 31.

In accordance with a program stored in the FlashROM 2, the CPU 31 fetches the output of the sensor 4 and data transmitted along the fieldbus, computes a control output, and outputs the results to the fieldbus.

As described above, in order to rewrite the contents of a nonvolatile memory such as the FlashROM 2, data stored in the nonvolatile memory must be erased before the rewriting. When the field device 9 receives an updating instruction, the field device 9 shifts to the standby state for memory updating. That is, the CPU 31 activates the ICTRL (current addition control signal; positive logic), and the current provided from the fieldbus is increased to a value greater than a normal value. After the erasing of data in the memory has been completed, the CPU 31 deactivates the current addition control signal, and the current provided from the fieldbus is returned to the normal value.

Generally, in order to erase the memory, the field device 9 is set to the DWNLD_PREPARING state conforming to the Software Download standards of the Fieldbus Foundation. That is, the host system 5 monitors whether the field device 9 is in the DWNLD_PREPARING STATE to determine whether the memory is currently being erased.

When one of the field devices 9 is preparing to update the memory by monitoring the DWNLD_PREPARING state of each field device 9, the host system 5 does not transmit an updating instruction to other field devices. Therefore, two or more field devices can be prevented from performing at the same time an erasing operation that requires a large consumption of power.

In FIG. 5, when a trigger signal from the ICTRL is transmitted to a current control circuit 40, the current control circuit 40 controls a current Iset provided from the fieldbus to be increased.

Figure 6:
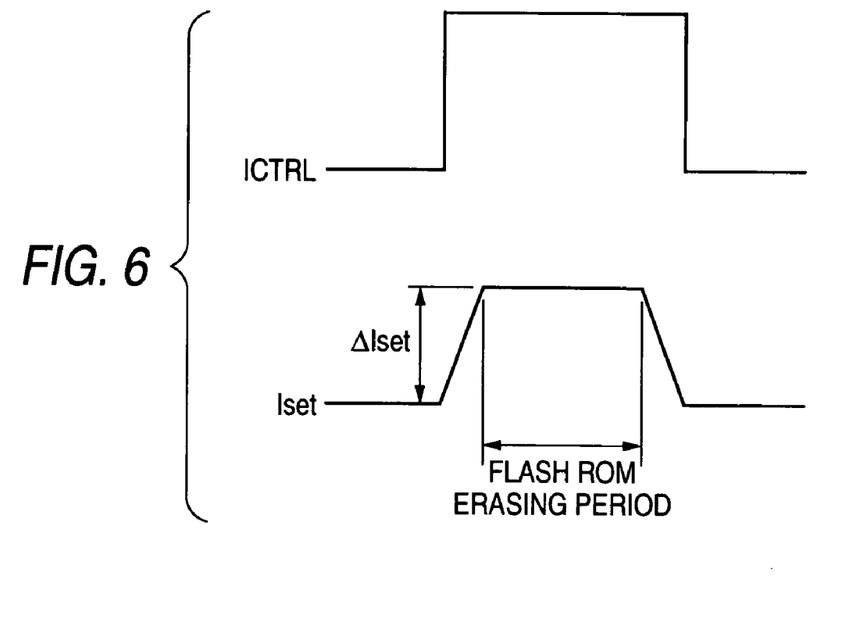
FIG. 6 is a diagram for explaining the increase in a current that is to be drawn out through a fieldbus.

That is, as shown in FIG. 6, in accordance with the program in the CPU 31, the ICTRL is set to the high level (H) before the erasing of the FlashROM 2 is performed, and is set to the low level (L) after the erasing has been completed.

When the current Iset is sharply increased or reduced, communication through the fieldbus is adversely affected. Thus, in accordance with the physical layer standards of the fieldbus (IEC 61158-2), the inclination in the change of the current must be a constant value or smaller. Therefore, an appropriate time constant circuit is included in the current control circuit 40 to suppress the change rate of the current Iset. A current detecting resistor 43 is a feedback resistor for maintaining a desired value for the current Iset, and is connected to the current control circuit 40.

Among the states defined by the Software Download standards (FF-883) for the FOUNDATION Fieldbus, the state in which the erasing of the FlashROM should be performed is generally the DWNLD_PREPARING state. The shifting to the DWNLD_PREPARING state is performed when the host system 5 has written download preparation instruction PREPARE_FOR_DWNLD to parameter DOMAIN_DESCRIPTER. By employing this writing as a trigger, the contents of the FlashROM 2 can be erased.

The Iset increase period required for erasing the contents of the FlashROM 2 is several seconds to several tens of seconds depending on the characteristic of the FlashROM 2. So long as the period for the erasing of the FlashROM 2 does not overlap in the same fieldbus segment, the current increase for the entire bus is only ΔIset. As a result, the limitations applied for the connection of a device to the fieldbus can be minimized.

Figure 7:
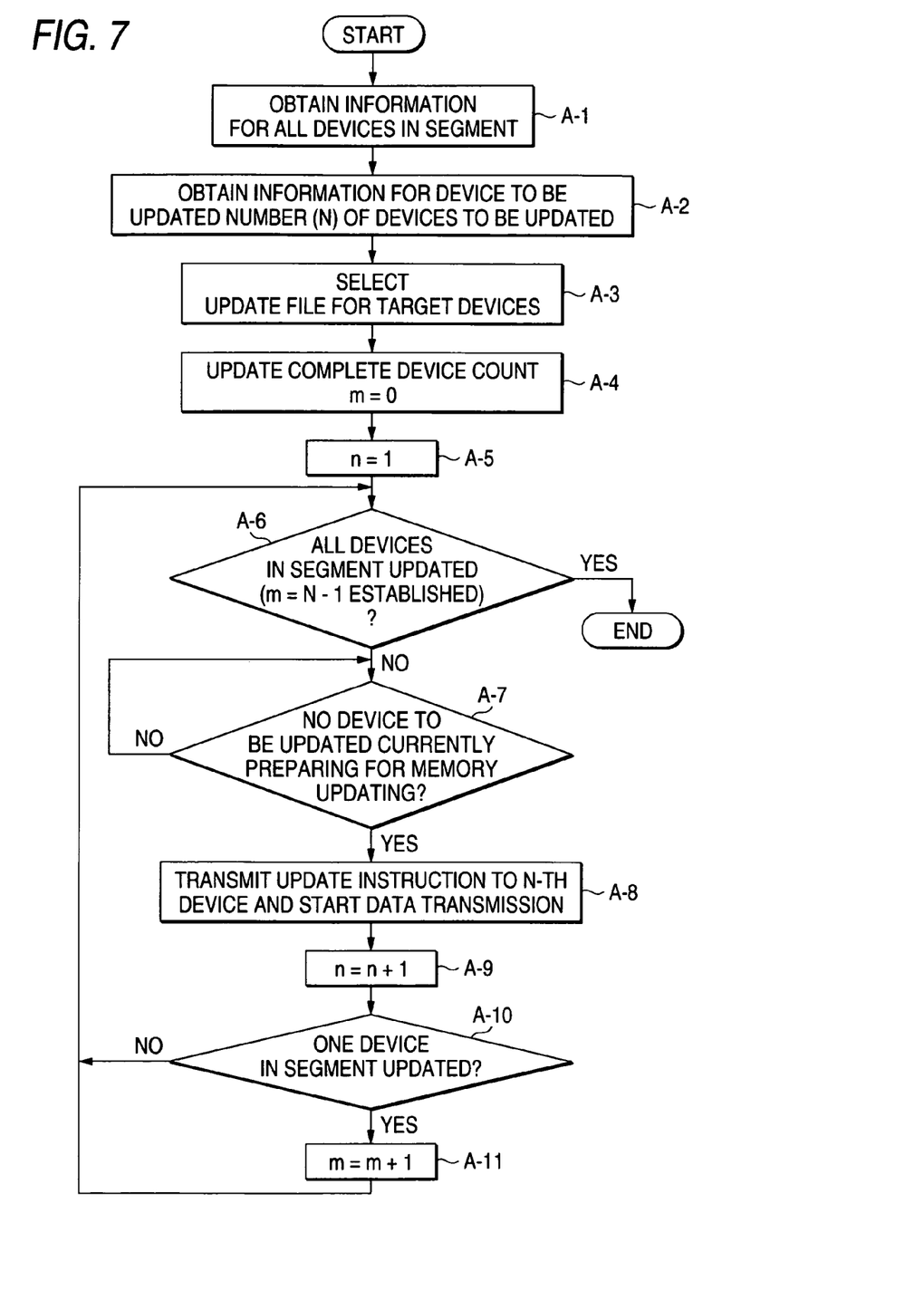
FIG. 7 is a flowchart for explaining the processing performed in the embodiment of the present invention.

FIG. 7 is a flowchart showing the processing for updating the FlashROM 2. First, at step A-1, information for all the device models in a segment, such as manufacturing and target models, node addresses, tags and firmware revisions, is obtained. This information may be obtained at the time a program is executed, or may be obtained by the employment, in advance, of a specific method.

At step A-2, information for a model for which the firmware is to be updated is obtained. This information includes the number of field devices for memory updating, and in this embodiment, the number of field devices is designated as "N". Then, at step A-3, a file in which a binary image to be updated is stored is selected.

At step A-4, the number "m" of devices that have been updated is set as 0, and at step A-5, "n" is set as 1. At step A-6, a check is performed to determine whether the updating for all the field devices in the segment has been completed.

This process is performed by determining whether the number "m" of the field devices that have been updated is smaller by one than the number "N" of the field devices to be updated.

At step A-7, a check is performed to determine whether all the field devices to be updated are currently preparing for the updating operation. When one of the field devices is currently preparing, program control returns to the state following step A-7, and waits at step A-7 until all the field devices to be updated complete the preparations for the updating operation.

When all the field devices to be updated have prepared for the memory updating, at step A-8 an updating instruction is transmitted to the n-th field device, and the transmission of data used for the updating is initiated. Then, at step A-9, "n" is incremented by one.

At step A-10, when the updating for one of the field devices in the segment has been completed, i.e., when the updating operation is not currently being performed for any field devices in the segment, the number "m" of the devices for which the updating has been completed is incremented by one (step A-11), and program control returns to step A-6. When the updating continues to be performed for a field device in the segment, program control returns to step A-6 without performing any further process.

Specifically, at step A-7, it is confirmed that all the field devices to be updated have prepared for the memory updating, and an updating instruction is sequentially transmitted to the field devices to start the transfer of update data. Therefore, since erasing of memory is performed for only one field device at a time, the increase of in the consumption of power can be minimized.

Furthermore, since the writing that increases power consumption only a little is performed in parallel, the memory updating period can be considerably shortened. In a case wherein ten field devices are connected in one segment, and wherein erasing is performed for the devices one by one and writing to the FlashROM 2 is performed in parallel for the ten devices, since fifteen to thirty seconds is required to erase all the sectors in the FlashROMs 2, $$\begin{aligned}\text{Updating period} &= \text{Data erasing period for the } \textit{FlashROM } 2\times \\ &\quad \text{The number of connected devices} + \\ &\quad \text{Updating period for each device} \\ &= 15 \text{ seconds} \times 10 + 30 \text{ minutes} \\ &= 32.5 \text{ minutes}\end{aligned}$$

Thus, the updating operation can be performed in about $\frac{1}{10}$ of the time required to perform the updating of the devices one by one.

The following advantages are obtained by the embodiment.

When it is detected that no field device for which the nonvolatile memory is to be updated currently prepares for the memory updating, an updating instruction is issued to a field device to be updated and update data are transmitted to the field device.

During the preparation for the memory updating, the erasing of memory that requires a large consumption of power is performed. According to the embodiment of the invention, an updating instruction is transmitted only when no field device currently prepares for the memory updating, so that the erasing of memory is permitted only for one field device at a time. The field device changes a current addition control signal, and increase the current provided from the field bus to the value greater than the normal value only when the data stored in the memory is erased. Then, after the erasing of memory has been completed, the field device returns the current addition control signal to the original level, and returns the current provided from the fieldbus to the normal value. According to the arrangement, the increase in the power consumed by the entire fieldbus can be minimized.

Therefore, a current shortage does not occur during the memory updating, and the limitation imposed on the number of field devices that can be connected to one segment can also be removed. Further, only a short period of time is required to the memory updating.

In addition, since the period for increasing the current provided from the fieldbus is defined as a period in the DWNLD_PREPARING state conforming to the Fieldbus Foundation standards, the updating processing can be performed in accordance with the standards.

Moreover, since the change rate of the current provided from the fieldbus is suppressed by the time constant circuit during the increase or decrease of the current, a fluctuation in the communication through the fieldbus can be prevented.

What is claimed is:

1. A memory updating system for a field device comprising:
    a fieldbus;
    one or more field devices that incorporate a nonvolatile memory and are connected to the fieldbus;
    a host system that is directly or indirectly connected to the fieldbus and transmits an updating instruction and updating data to one of the field devices in order to update the nonvolatile memory of the field device; and
    a current control circuit that controls a current provided from the fieldbus,
    wherein the current control circuit increases the current provided from the fieldbus to a value greater than a normal value before the field device erases data stored in the nonvolatile memory, and returns the current provided from the fleidhus to the normal value after the field device completes the erasing of the data stored in the nonvolatile memory, and before the nonvolatile memory of the field device is updated.

2. The memory updating system according to claim 1, wherein the field device during a period for increasing the current provided from the fieldbus is in a DWNLD_PREPARING state conforming to the Software Download standards of the Foundation Fieldbus.

3. The memory updating system according to claim 1, wherein the current control circuit has a current change rate limiting circuit that limits a rate of change of the current provided from the fieldbus.

4. The memory updating system according to claim 3, wherein the current change rate limiting circuit is a time constant circuit.

5. The memory updating system according to claim 1, wherein the field device outputs status information indicating that the field device is in a state of preparing for an update of the nonvolatile memory, and
    the host system selects a field device for which the nonvolatile memory is to be updated based on the status information output from the field device.

* * * * *